United States Patent [19]

Stauffer et al.

[11] Patent Number: 5,394,390
[45] Date of Patent: Feb. 28, 1995

[54] FDDI NETWORK TEST ADAPTER HISTORY STORE CIRCUIT (HSC)

[75] Inventors: David R. Stauffer, League City; Rebecca S. McMahon, Houston, both of Tex.; Thomas J. Eckenrode, Endicott, N.Y.

[73] Assignee: International Business Machines Corporation, Armonk, N.Y.

[21] Appl. No.: 144,989

[22] Filed: Oct. 29, 1993

[51] Int. Cl.$^6$ .............................................. H04J 1/16
[52] U.S. Cl. ..................................... 370/17; 371/37.7
[58] Field of Search ................... 370/17, 13, 94.1, 60, 370/85.1, 85.4, 85.5, 110.1, 48, 85.2, 85.13, 86.3; 371/37.7, 5.1, 20.6, 20.4, 19; 340/825.5, 825.51; 358/413; 375/118, 117

[56] References Cited

U.S. PATENT DOCUMENTS

| 4,731,880 | 3/1988 | Ault et al. | 359/120 |
| 4,748,617 | 5/1988 | Drewlo | 359/121 |
| 4,823,305 | 4/1989 | Holdred et al. | 395/325 |
| 4,896,319 | 1/1990 | Lidinsky et al. | 370/60 |
| 4,914,652 | 4/1990 | Nguyen | 370/85.5 |
| 4,977,582 | 12/1990 | Nichols et al. | 375/118 |
| 5,023,872 | 6/1991 | Annamalai | 371/5.1 |
| 5,043,981 | 8/1991 | Firoozmand et al. | 370/85.1 |
| 5,063,575 | 11/1991 | Annamalai | 375/108 |
| 5,067,130 | 11/1991 | Jackson | 371/22.1 |
| 5,128,935 | 7/1992 | Perloff et al. | 370/85.4 |

Primary Examiner—Douglas W. Olms
Assistant Examiner—Dang Ton
Attorney, Agent, or Firm—Whitham, Curtis, Whitham & McGinn

[57] ABSTRACT

A History Store Circuit (HSC) is employed with a commercially available FDDI chipset to provide an interface between the PHY layer hardware and a memory system to record symbol stream segments received from the FDDI network. Memory system address and control signals are provided by the HSC. Multiplexor logic is included to support dual-ring network configurations. The HSC provides the electrical interconnection required to interface to the PHY layer hardware so as to allow reception of invalid frames, valid frames, and invalid/valid line state symbol streams from the fiber optic bus. In order to receive such invalid frames and state symbol streams from the fiber optic media, additional logic is provided to allow the user to focus on the segment of network traffic of interest. The HSC includes a Symbol Stream Comparator (SSC) and History Store Triggering Logic (HSTL) to facilitate control of the network traffic segment captured by the HSC. Using this logic, history store capture can be started or stopped based upon receipt of a specific network symbol stream. This allows the user to selectively collect symbol stream data from the network based upon a triggering symbol stream.

10 Claims, 3 Drawing Sheets

FDDI NETWORK TEST ADAPTER HISTORY STORE CIRCUIT (HSC)

BACKGROUND OF THE INVENTION

1. Field of the Invention

The present invention generally relates to test adapters for networks implementing the Fiber optic Distributed Data Interface (FDDI) standard and, more particularly, to a History Store Circuit (HSC) which may be employed with any commercially available FDDI chipset that complies with the American National Standards Institute (ANSI) X3T9.5 FDDI standard. This HSC allows access to symbol stream data discarded by the Media Access Control (MAC) hardware, and allows the user to focus on the segment of network traffic of interest.

2. Description of the Prior Art

A Local Area Network (LAN) of choice for large bandwidth applications is the Fiber optic Distributed Data Interface (FDDI) standard. Hardware support for this interface is provided by various commercially available chipsets. These commercially available chipsets are used for implementing a station which complies with the American National Standards Institute (ANSI) X3T9.5 FDDI standard and are designed to receive frames and symbols from a fiber optic media. Such chipsets typically implement the Physical (PHY) and Media Access Control (MAC) layers of the FDDI network protocol. The purpose of the PHY layer as it applies to FDDI networks is to serialize data for transmission and to deserialize received data and synchronize this data to the local clock reference. The propose of the MAC layer is to add MAC layer protocol symbols to the Protocol Data Units (PDUs) being transmitted and to scan the network traffic received by the PHY layer hardware for valid PDUs addressed to the station. All invalid PDUs, MAC protocol PDUs, PDUs transmitted by the station, PDUs addressed to other stations, and symbol streams occurring between valid PDUs are either used internally by the MAC hardware or are discarded. These PDUs and symbol streams are not available for examination by higher layer software applications.

The development of network hardware and software requires test equipment capable of generating test traffic to a station under test and receiving response traffic from that station. Test scenarios must include both nominal and off-nominal test conditions. Network interfaces implemented with standard commercial chipsets are sufficient to establish peer communication on the network, and thereby support test applications for the higher layers of the network protocol. However, since the test application does not have access to symbol data stream data discarded by the MAC hardware, MAC and PHY layer testing cannot be implemented with such hardware.

PHY and MAC layer test applications require analysis by the software test application of the symbol streams discarded by the MAC hardware. These network symbol streams can include invalid PDUs, valid PDUs to and from any network station, and invalid or valid line state symbol streams. Existing FDDI network test tools include devices capable of capturing symbol streams from the network. Such test tools consist of PHY layer hardware which feeds received data into a buffer with no intervening MAC layer implementation. Since such test tools do not include MAC hardware, they are not capable of communicating as a peer node on the network and are therefore suitable for testing of the MAC and PHY layer protocols only.

Using currently available test equipment products, for a network test laboratory to support testing of all layers of the network protocol, multiple pieces of test equipment are required. Both peer communication stations and passive symbol stream capture stations are needed. The network must be reconfigured with one or the other of these pieces of test equipment based upon the type of testing to be performed.

SUMMARY OF THE INVENTION

It is therefore an object of the present invention to provide a History Store Circuit (HSC) that permits merging the various test equipment units required for FDDI network testing into a single test unit, thereby simplifying network testing.

According to a preferred embodiment of the invention, there is provided a History Store Circuit (HSC) which is employed with a commercially available FDDI chipset. The HSC provides an interface between the PHY layer hardware and a memory system to record symbol stream segments received from the FDDI network. Memory system address and control signals are provided by the HSC. Multiplexor logic is included to support dual-ring network configurations. The HSC provides the electrical interconnection required to interface to the PHY layer hardware so as to allow reception of invalid flames, valid flames, and invalid/valid line state symbol streams from the fiber optic bus. In order to selectively receive such invalid flames and state symbol streams from the fiber optic media, additional logic is provided to allow the user to focus on the segment of network traffic of interest. The HSC includes a Symbol Stream Comparator (SSC) and History Store Triggering Logic (HSTL) to facilitate control of the network traffic segment captured by the HSC. Using this logic, history store capture can be started or stopped based upon receipt of a specific network symbol stream. This allows the user to collect selected symbol stream data from the network based upon a triggering symbol stream.

In this preferred embodiment of the invention, the HSC coexists with the commercially available chipset in order to provide a single test adapter design to meet the requirements of a wide range of FDDI hardware/software testing and verification environments. By unifying these test environment, hardware/firmware design costs are reduced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention is described in terms of a concrete implementation using a commercially available chipset from Advanced Micro Devices (AMD); however, it will be understood by those skilled in the art that this implementation is by way of example only and that other chipsets that comply with the American National Standards Institute (ANSI) X3T9.5 FDDI standard from other manufacturers may be used in the practice of the invention.

The AMD chipset includes an Encoder/Decoder (ENDEC) chip which, in conjunction with the AMD ENDEC Data Separator (EDS) chip, receives serial data from the network and converts this data to a parallel, partially decoded format, thus implementing the PHY layer hardware of the FDDI standard. The ENDEC received data is then routed to the AMD Fiber Optic Ring Media Access Controller (FORMAC). The FORMAC performs the Media Access Control (MAC) layer protocol for the FDDI network. The FORMAC uses start and end delimiter symbols and Cyclic Redundancy Check (CRC) calculation to determine the validity of received network frames. Symbols received between valid frames are discarded, as required by the FDDI standard. In addition, certain types of valid frames (such as tokens, claim frames, and frames transmitted by this node) are processed and discarded by the FORMAC.

Frames and symbol streams discarded by the FORMAC are not available to application software. For network testing applications, various PHY and MAC layer tests require analysis by application software of the information discarded by the FORMAC.

Figure 1:
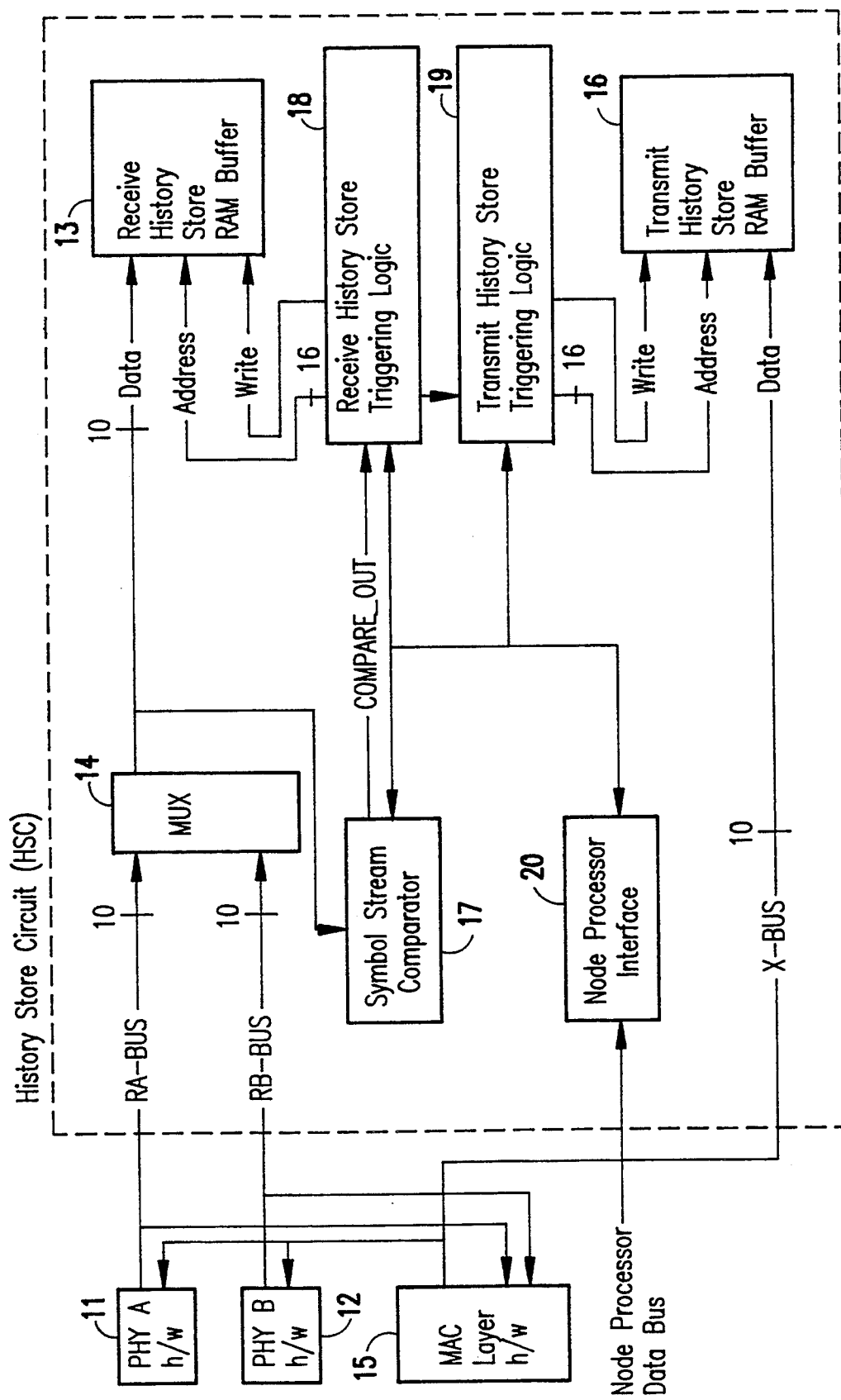
FIG. 1 is a block diagram of the History Store Circuit (HSC) according to a preferred embodiment of the invention.

Referring now to the drawings, and more particularly to FIG. 1, there is shown the History Store Circuit (HSC) according to a preferred embodiment of the invention. The HSC interfaces directly to the AMD ENDEC chips 11 and 12, denoted respectively as PHY A and PHY B. When the FDDI card is operating in the history store mode, the symbol data is obtained from either the primary or the secondary FDDI network rings for a dual-ring network configuration. This symbol data is stored in the receive history store memory buffer 13 via multiplexor 14, which receives data from ENDEC A 11 on receive (RA) bus and from ENDEC B 12 on receive (RB) bus. Additionally, the ENDEC transmit symbol data input from the FORMAC 15 is stored in the transmit history store memory buffer 16. This buffer supports self-testing of the node.

There are three principal components of the HSC. These are the Symbol Stream Comparator (SSC) 17, the History Store Triggering Logic (HSTL) which is composed of the Receive History Store Triggering Logic (RHSTL) 18, the Transmit History Store Triggering Logic (THSTL) 19, and the Node Processor interface 20. The SSC 17 compares the incoming receive symbol stream against a symbol trigger sequence (e.g., up to twelve symbols in length) and generates a compare if a match occurs. The HSTL 18 and 19 controls symbol stream data storage in the receive and transmit history store memory buffers. Initiation and termination of this data storage is determined through node processor interface control registers and compares from the SSC.

The Node Processor interface 20 is logic that provides a control/status interface to a local embedded processor, referred to as the Node Processor (NP).

The receive history store may be set to start and stop upon a trigger condition as generated by the SSC logic 17. The received data from the RA bus and RB bus enter the multiplexor 14. Selection control for multiplexor 14 is provide by the Node Processor interface.

Figure 2:
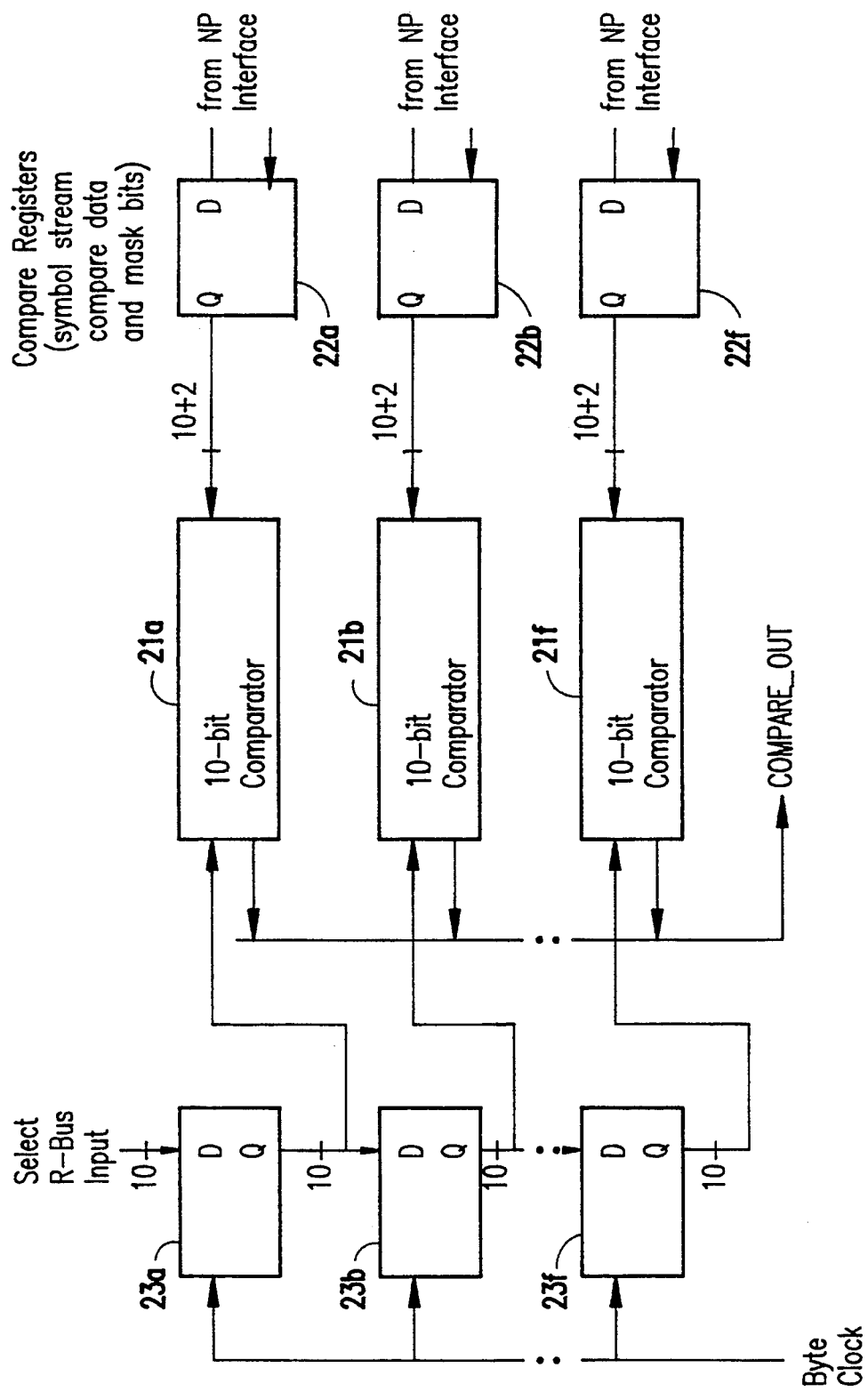
FIG. 2 is a block diagram showing the details of the Symbol Stream Comparator (SSC) used in the HSC shown in FIG. 1.

FIG. 2 shows a block diagram of the SSC 17. Data from the selected bus is clocked into a 10-bit wide, 6-deep shift register 21a to 21f. Thus, the last six symbol-pairs on the selected R bus are always present within this shift register. Each symbol-pair is compared against the compare value loaded into the corresponding compare register 22a to 22f. For each symbol, there is a corresponding mask bit (two bits per symbol-pair), latches 23a to 23f. If the mask bit is set, then the corresponding symbol is "don't care" and will always generate a successful compare. If all symbol-pairs match the compare value loaded into the compare registers, then the COMPARE_OUT signal is active.

The SSC 17 may be implemented with a commercially available Programmable Logic Array (PLA), such as the Xilinx Logic Cell Array. The SSC takes advantage of the tri-state resources within the logic cell array to implement comparators using wire-AND functions. This architecture conserves resources within the PLA chip.

Figure 3:
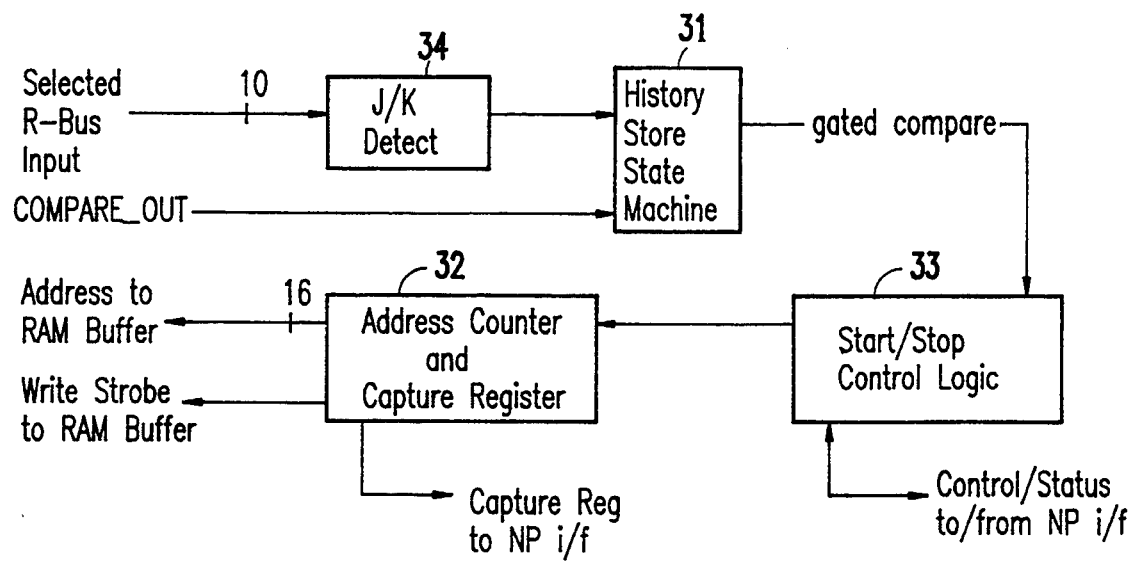
FIG. 3 is a block diagram showing the details of the Receive History Store Triggering Logic (RHSTL) used in the HSC shown in FIG. 1.

As shown in FIG. 3, the RHSTL 18 comprises JK detect logic 34, a history store state machine 31, an address counter and capture register 32, and start/stop control logic 33. The history store state machine 31 gates the COMPARE_OUT signal from the SSC 17 based upon the selected trigger mode. As set through the Node Processor interface 20, any of the following trigger modes may be used:

Trigger on any symbol match;
Trigger on Source Address (SA) field only;
Trigger on Destination Address (DA) field only; and
Trigger on SA or DA fields.

When the mode is set for "trigger on any symbol stream match", the history store state machine 31 is disabled, and any assertion of COMPARE_OUT is gated through to the RHSTL start/stop control logic 33. For any other mode, COMPARE_OUT is gated through by the history store state machine 31 only if it occurs in the proper field of the incoming receive frame as detected by J/K detect logic 34. The history store state machine 33 provides this gating by referencing the timing of the COMPARE_OUT signal to the received frame's start delimiter (e.g., a J/K symbol pair).

The Node Processor interface 20 selects one of the following modes of operation for the RHSTL start/stop control logic:

Receive history store manual start/run until full. In this mode, the RHSTL 18 starts storing symbols in the receive history store RAM buffer 13 upon command from the Node Processor interface 20. Symbols continue to be stored until the RAM is full, and then symbol storage automatically stops.

Receive history store manual start/manual stop. In this mode, the RHSTL 18 starts storing symbols in the receive history store RAM buffer 13 upon command from the Node Processor interface 20. Symbols continue to be stored until a commanded stop is received from the Node Processor interface 20.

Receive history store start on trigger/run until full. In this mode, the RHSTL 18 starts storing symbols in the receive history store RAM buffer 13 upon occurrence of a COMPARE_OUT from the SSC 17, as gated by the history store state machine 31. Symbols continue to be stored until the RAM is full, and then symbol storage automatically stops.

Receive history store manual start/stop on trigger. In this mode, the RHSTL 18 starts storing symbols in the receive history store RAM buffer 13 upon command from the Node Processor interface 20. Symbols continue to be stored until the occurrence of a COMPARE_OUT from the SSC 17, as gated by the history store state machine 31.

The RHSTL start/stop control logic 33 provides control for the address counter and capture register 32. The RHSTL address counter is a 16-bit counter which provides the address for the receive history store RAM buffer 13. This logic also provides a write strobe for the RAM. For "Run Until Full" modes of operation, this counter starts symbol storage at address "0000" (hexidecimal) in the RAM. Upon reaching address "FFFF" (hexidecimal), symbol storage automatically stops. For other modes, this counter continues storing symbols after the buffer RAM is filled so that the most recent 64K pairs of symbols are always present in the RAM. When symbol storage stops (due to a COMPARE_OUT or a commanded stop from the Node Processor interface 20), the capture register contains the last address in which data was stored.

Figure 4:
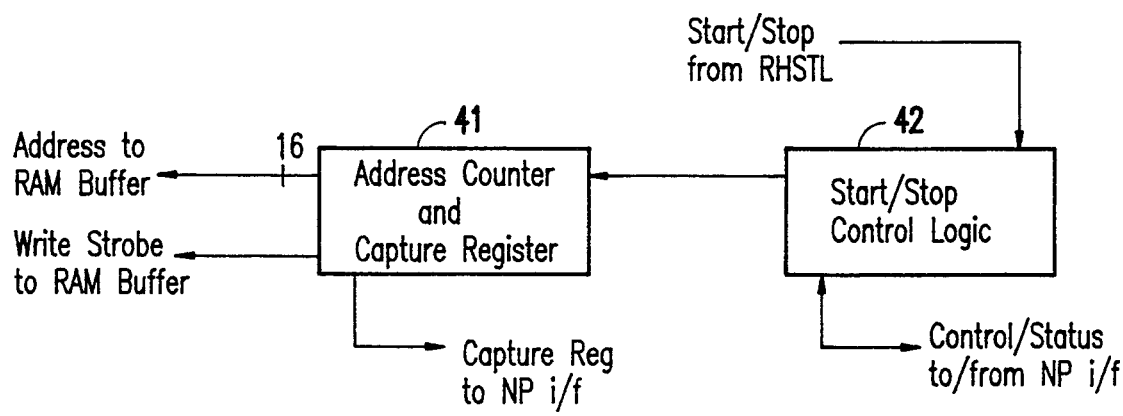
FIG. 4 is a block diagram showing the details of the Transmit History Store Triggering Logic (THSTL) used in the HSC shown in FIG. 1.

As shown in FIG. 4, the THSTL 19 comprises an address counter and capture register 41 and start/stop control logic 42. The transmit history store functionally allows the HSC to support node self-test capabilities. The THSTL 19 is started and stopped either through the Node Processor interface 20 or based upon the Operation of the RHSTL 18. The Node Processor interface 20 selects one of the following modes of operation for the THSTL start/stop control logic:

Transmit history store manual start/run until full. In this mode, the THSTL 19 starts storing symbols in the transmit history store RAM buffer 16 upon command from the Node Processor interface 20. Symbols continue to be stored until the RAM is full, and then symbol storage automatically stops.

Transmit history store manual start/manual stop. In this mode, the THSTL 19 starts storing symbols in the transmit history store RAM buffer 16 upon command from the Node Processor interface 20. Symbols continue to be store until a commanded stop is received from the Node Processor interface 20.

Transmit history store shadow start/run until full. In this mode, the THSTL 19 starts storing symbols in the transmit history store RAM buffer 16 coincident with the start of symbol storage by the RHSTL 18. Symbols continue to be stored until the RAM is full, and then symbol storage automatically stops.

Transmit history store shadow start/shadow stop. In this mode, the THSTL 19 starts and stops storing symbols in the transmit history store RAM buffer 16 coincident with the start and stop of symbol storage by the RHSTL 18.

The THSTL start/stop control logic 42 provides control of the address counter and capture register 41. The THSTL address counter is a 16-bit counter which provides the address for the transmit history store RAM buffer. This logic also provides a write strobe for the RAM. Operation of this logic is similar to that of the RHSTL address counter and capture register 32.

The Node Processor interface 20 provides access to a generic, on-card processor bus to control HSC functions and monitor HSC status. This interface includes access to the following control register bits:

| Control Bit(s) | Description |
| --- | --- |
| R-Bus Select | Selects either the RA-bus or the RB-bus to provide symbol stream input to the SSC 17 and the receive history store RAM buffer 13. |
| RHS_Run | Provides manual start/stop control for the receive history store triggering logic. |
| RHS_Mode (4-bits) | Provides triggering mode selection for the receive history store triggering logic, including the history store state machine 31. |
| THS_Run | Provides manual start/stop control for the transmit history store triggering logic. |
| THS_Mode (2-bits) | Provides triggering mode selection for the transmit history store triggering logic. |

This interface also provides access to the following status signals:

| Status Bit(s) | Description |
| --- | --- |
| Triggered | Indicates a gated COMPARE_OUT occurred. This compare may have been used as a trigger by the receive history store triggering logic dependent upon the triggering mode set by the Node Processor interface 20. |
| RHS_DONE | Indicates that the receive history store triggering logic is terminated symbol storage in the receive history store RAM buffer 13. The condition which caused this termination is dependent upon the triggering mode set by the Node Processor interface 20. |
| THS_DONE | Indicates that the transmit history store triggering logic has terminated symbol storage in the transmit history store RAM buffer 16. The condition which caused this termination is dependent upon the triggering mode set by the Node Processor interface 20. |
| RHS_WRAP | For triggering modes which do not automatically stop when the receive history store RAM buffer is filled, this status bit indicates that the RAM buffer has completely filled. First/last address of data may be calculated based upon the RHSTL capture register. In the event this bit is not set, then the receive history store RAM buffer contains less than 64K pairs of symbols. |
| THS_WRAP | For triggering modes which do not automatically stop when the transmit history store RAM buffer is filled, this status bit indicates that the RAM buffer has completely filled. First/last address of data may be calculated based upon the THSTL capture register. In the event this bit is not set, then the transmit history store RAM buffer contains less than 64K pairs of symbols. |

In addition to the control/status information described above, the RHSTL capture register and the THSTL capture register can be read through this interface by the Node Processor and the symbol compare pattern and mask bits can be loaded into the SSC 17 through this interface by the Node Processor.

While the invention has been described in terms of a single preferred embodiment, those skilled in the art will recognize that the invention can be practiced with modification within the spirit and scope of the appended claims. The described embodiment, while implemented using the AMD chipset, can be implemented with other commercially available chipsets. The invention provides an integrated hardware vehicle that allows development of an automated test environment, allowing various pieces of laboratory equipment used for FDDI network testing to be combined into a single box capable of being controlled by an automated test software application. Thus, FDDI network testing can be performed with limited technician oversight and without any manual reconfiguration or manual test sequencing.

Having thus described our invention, what we claim as new and desire to secure by Letters Patent is as follows:

1. A history store circuit that provides an interface between a physical (PHY) layer hardware and a memory system to record symbol stream segments received from a fiber optic distributed data interface (FDDI) network, comprising:
   a symbol stream comparator (17) connected to receive an incoming symbol stream from said physical layer hardware for comparing said incoming symbol stream with a symbol trigger sequence received from said FDDI network and for generating a compare output if a match occurs;
   history store triggering logic (18, 19) responsive to said compare output from said symbol stream comparator to control symbol stream data storage in said memory system, said history store triggering logic having a plurality of modes of operation; and
   a node processor interface (20) connected to said symbol stream comparator and said history store triggering logic for functioning as a control and status interface for a node processor, said node processor for controlling the modes of operation of said history store triggering logic and for reading conditions of said symbol stream comparator, said memory system and said history store triggering logic.

2. The history store circuit recited in claim 1 wherein said symbol stream comparator comprises:
   a compare register storing a compare value; and
   a symbol shift register and comparator connected to receive symbol data from the FDDI network and compare the symbol data with the compare value.

3. The history store circuit recited in claim 2 wherein said symbol stream comparator further comprises mask bit latches, one for each data symbol, said mask bit latches being selectively set with a mask bit to flag a data symbol as "don't care", said node processor interface supplying a data path for the node processor for writing the compare value to said compare register and setting said mask bit latches.

4. The history store circuit recited in claim 1 wherein said history store triggering logic comprises:
   a receive history store buffer for storing selected received data symbols from the FDDI network;
   receive history store triggering logic responsive to the compare output for generating address and write control signals to the receive history store buffer;
   a transmit history store buffer for storing selected data symbols transmitted on the FDDI network; and
   transmit history store triggering logic responsive to the compare output for generating address and write control signals to the transmit history store buffer, said transmit history store triggering logic supporting self testing of a node.

5. The history store circuit recited in claim 4 wherein said receive history store triggering logic comprises:
   start/stop control logic connected to the node processor interface and responsive to the node processor to operate in one of a predetermined number of modes;
   a history store state machine connected to gate the compare output from the symbol stream comparator to the start/stop control logic; and
   a capture register containing a last address in the receive history store buffer to which data was stored, said capture register being responsive to the start/stop control logic and generating said address and write control signals to said receive history store buffer.

6. The history store circuit recited in claim 5 wherein said history store state machine implements one of the following trigger modes in said start/stop control logic:
   trigger on any symbol match,
   trigger on source address field only,
   trigger on destination address field only, and
   trigger on source address or destination address field.

7. The history store circuit recited in claim 6 wherein said predetermined modes of said start/stop control logic comprise:
   manual start and run until fill,
   manual start/stop,
   start on trigger and run until full, and
   manual start and stop on trigger.

8. The history store circuit recited in claim 5 wherein said transmit history store triggering logic comprises:
   second start/stop control logic connected to the node processor interface and responsive to the node processor to operate in one of a predetermined number of modes; and
   a second capture register containing a last address in the transmit history store buffer to which data was stored, said second capture register being responsive to the second start/stop control logic and generating said address and write control signals to said transmit history store buffer;
   said node processor interface supplying a data path for the node processor for reading values stored in said first and second compare registers.

9. The history store circuit recited in claim 8 wherein said symbol stream comparator comprises:
   a compare register storing a compare value, said node processor interface supplying a data path for the node processor for writing the compare value to said compare register; and
   a symbol shift register and comparator connected to receive symbol data from the FDDI network and compare the symbol data with the compare value.

10. The history store circuit recited in claim 9 wherein said history store state machine implements one of the following trigger modes in said start/stop control logic:
   trigger on any symbol match,
   trigger on source address field only,
   trigger on destination address field only, and
   trigger on source address or destination address field; and
wherein said predetermined modes of said start/stop control logic set by the node processor via the node processor interface comprise:
   manual start and run until fill,
   manual start/stop,
   start on trigger and run until full, and
   manual start and stop on trigger.

* * * * *